US008377304B2

(12) United States Patent
Dey et al.

(10) Patent No.: US 8,377,304 B2
(45) Date of Patent: Feb. 19, 2013

(54) METHOD FOR TREATMENT OF SLUDGE IN WATER PURIFICATION

(75) Inventors: Estera Szwajcer Dey, Uardavägen (SE); Olof Norrlöw, Kung Kristoffersgatan (SE)

(73) Assignee: Kemira Oyj, Helsinki (FI)

( * ) Notice: Subject to any disclaimer, the term of this patent is extended or adjusted under 35 U.S.C. 154(b) by 441 days.

(21) Appl. No.: 12/601,593

(22) PCT Filed: May 30, 2008

(86) PCT No.: PCT/SE2008/000376
§ 371 (c)(1),
(2), (4) Date: Apr. 8, 2010

(87) PCT Pub. No.: WO2008/147296
PCT Pub. Date: Dec. 4, 2008

(65) Prior Publication Data
US 2010/0200499 A1  Aug. 12, 2010

(30) Foreign Application Priority Data
May 31, 2007  (SG) ..................... 0701378

(51) Int. Cl.
*C02F 11/04* (2006.01)
(52) U.S. Cl. ........ 210/603; 210/613; 210/631; 210/632; 435/262.5
(58) Field of Classification Search ............ 210/603, 210/612, 613, 631, 632; 435/262, 262.5
See application file for complete search history.

(56) References Cited

U.S. PATENT DOCUMENTS

| 4,267,049 | A | * | 5/1981 | Erickson et al. ............. 210/606 |
| 5,019,267 | A |   | 5/1991 | Eberhard et al. |
| 5,443,656 | A |   | 8/1995 | Burrows et al. |
| 5,783,081 | A |   | 7/1998 | Gaddy |
| 6,569,332 | B2 | * | 5/2003 | Ainsworth et al. ........... 210/603 |
| 6,918,745 | B2 |   | 7/2005 | Caron et al. |

FOREIGN PATENT DOCUMENTS

| EP | 0220647 A1 | 5/1987 |
| EP | 0970922 A2 | 1/2000 |
| GB | 2167399 A | 5/1986 |

OTHER PUBLICATIONS

DE 3045712, Publication date: Oct. 22, 1981, Abstract, 1 page.
The International Bureau, Notification Concerning Transmittal of International Preliminary Report on Patentability (Chapter I of the Patent Cooperation Treaty), International Application No. PCT/SE2008/000376, Date of Mailing: Dec. 10, 2009, 8 pages.
WO 03059825, Publication date: Jul. 24, 2003, Abstract Only, 1 page.
JP08052490; Feb. 27, 1996; Abstract Only (1 page).
JP200061433; Feb. 29, 2000; Abstract Only (1 page).

(Continued)

*Primary Examiner* — Fred Prince
(74) *Attorney, Agent, or Firm* — Thomas Horstemeyer

(57) ABSTRACT

The present invention relates to a method for treatment of sludge in water purification, the method comprising the steps: providing an enzyme mixture comprising at least one enzyme capable of digesting natural polymeric materials; and adding the enzyme mixture and at least one chelating reagent, in optional order or simultaneously, to an aqueous sludge suspension.

16 Claims, 3 Drawing Sheets

OTHER PUBLICATIONS

Wawrzynczyk et al., "Application of enzymes, sodium tripolyphosphate and cation exchange resin for the release of extracellular polymeric substances from sewage sludge", Journal of Biotechnology 130 (2007) 274-281.

EP Search Report; EP Application No. 08 76 7049.3; Date of Completion of Search Jul. 7, 2010; 9 pages.

International Search Report; International Application No. PCT/SE2008/000376; International Application Filing Date May 30, 2008; (4 pages) mailed Sep. 5, 2008.

EP0226787 A2; Jul. 1, 1987; Abstract Only (1 page).

JP2004275949 A; Oct. 7, 2004; Abstract Only (1 page).

* cited by examiner

METHOD FOR TREATMENT OF SLUDGE IN WATER PURIFICATION

CROSS REFERENCE TO RELATED APPLICATIONS

This is a U.S. national stage of application No. PCT/SE2008/000376, filed on 30 May 2008. Priority under 35 U.S.C. §119(a) and 35 U.S.C. §365(b) is claimed from Swedish Patent Application No. 0701378-2, filed 31 May 2007, the disclosure of which is also incorporated herein by reference.

FIELD OF THE INVENTION

The present invention relates to a novel method for treatment of sludge in water purification and the use thereof.

BACKGROUND ART

The enzymatic hydrolysis of sludge has been investigated for the last two decades and a number of enzymes from different organisms have been reported to play an important role in a range of waste water treatment applications. Enzymes act on specific substances present in municipal sludge and therefore can change the characteristics of the waste. The sludge becomes more amenable to further treatment and bio-conversion to value-added products is facilitated. Enzymatic treatment of mixed sludge prior to the anaerobic digestion shows degradation of the sludge and lead to methane production. Enzymatic treatment of wastewater sludge has a potential contribution to the reduction of sludge volume without biomass generation.

Enzymes break down polymeric substances like proteins, polysaccharides and lipids through multi step processes. Initially, enzymes adsorb to the solid substrate and cleave small polymers that are loosely bound to the surface. The solubilisation of the more compact sludge core occurs at a lower rate dependent on the diffusion of the enzyme to surface active sites and core particles. Previous studies have shown that a combination of a protease, lipase and endo-glycanases accelerated solubilisation of municipal sludge. However, the enzymes became entrapped in the sludge. The entrapment decreased the enzymes action on the sludge but not on chromogenic soluble substrates present.

In UK patent application 2 167 399 a method for hydrolytic enzymatic treatment of organic substances and biomasses is described. The method describes a step where a chelate-former in the form of di-ammonium and/or tri-ammonium salt of nitrile tri-acetic acid is added to the method in the presence of oxygen, i.e. an aerated or aerobic process. The hydrolytic enzymes degrade protein structures. The end products of an enzymatic treatment in an aerated environment are carbon dioxide and water.

In U.S. Pat. No. 5,783,081 a method of improving performance of an operating anaerobic solids digester comprising a step of adding at least one substantially pure culture of at least one methanogen is described. In an embodiment described therein a chelating agent, citric acid, is added to said digester. It is only the combination of microbes, e.g. bacteria, and chelating agents in an anaerobic environment that is described in the patent.

There still exists a need within the art to find new ways to increase the degradation of sludge in water purification in order to achieve more cost effective methods. The enzymes that are used today are very expensive and if alternative methods can be provided where less enzymes are used, industrial water purification plants will see the benefits of such cost-effective methods.

SUMMARY OF THE INVENTION

The above mentioned problems have been solved by the present invention.

The present invention relates, in one aspect, to a method for treatment of sludge in water purification, characterized by the steps:

a) providing an enzyme mixture comprising at least one enzyme capable of digesting natural polymeric materials;

b) adding the enzyme mixture and at least one chelating reagent, in optional order or simultaneously, to an aqueous sludge suspension.

The present invention relates, in a further aspect, to the use of the above mentioned method, in addition to conventional digestion used in water purification.

The present invention relates, in a yet further aspect, to the use of the above-mentioned method, instead of conventional digestion used in water purification.

DETAILED DESCRIPTION OF THE INVENTION

Figure 1:
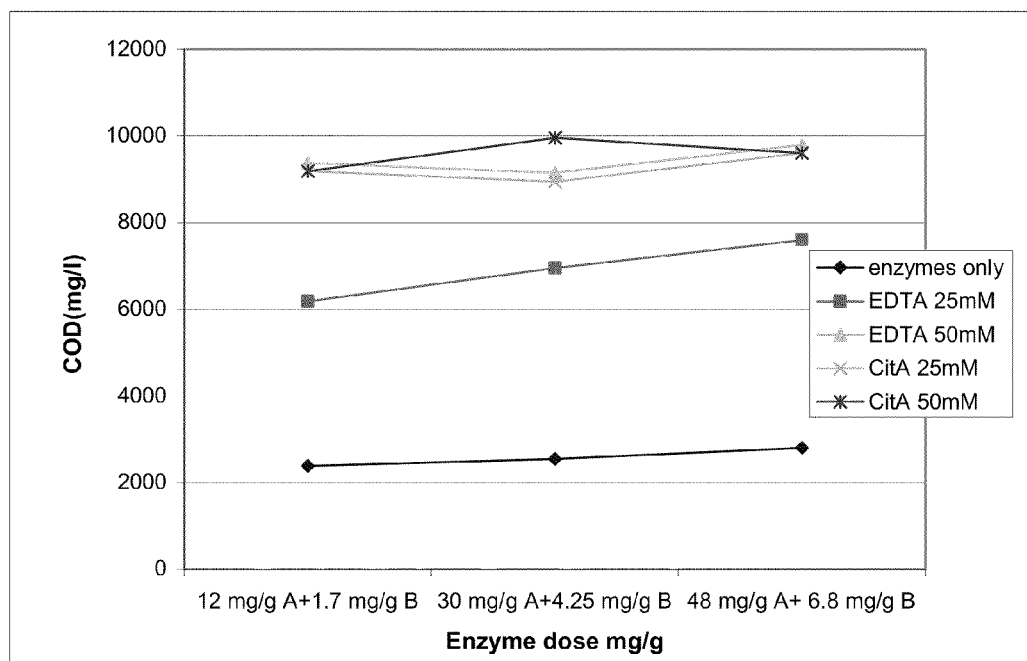
FIG. 1 depicts the COD (mg/l) released when using the chelating reagents citric acid (at 25 mM and 50 mM) and EDTA (at 25 mM and 50 mM) at different total enzyme doses (13.7 mg/g, 34.25 mg/g, and 54.8 mg/g) in comparison with in the absence of chelating reagents.

The object of the present invention is to provide novel methods for treatment of sludge in water purification. It has been realized that adding a chelating agent in accordance with the method of the invention to purification methods enhances the digestion of the sludge. Furthermore, the chelating agent prevents enzymes from being trapped on the sludge surface and enzymatic solubilisation of sludge is improved. The present invention would indeed be beneficial to the water purification industry for providing more efficient and cost effective processes. Therefore, enhancing the efficiency of the enzymes in water purification is the main focus of the present invention.

In an embodiment of the method according to the invention the at least one chelating reagent is chosen from the group consisting of citric acid (Cit A), ethylenediaminetetra-acetic acid (EDTA), tartaric acid, and their salts, Zeolite A, sodium fluoride, sodium thiosulphate in combination with Zeolite A, sodium silicate, sodium silicate in combination with Zeolite A, and any combination of the above. Thus, the chelating reagent may be a combination of two or more of the stated agents or any other chelating reagent not specifically mentioned herein. It is realized by a person skilled in the art that any other chelating reagent, not specifically mentioned herein, might be used in accordance with the invention as long as the desired result is achieved. However, chelating reagents containing phosphorous are not suitable because they increase the phosphorous load in the effluent.

The positive effect of different chelating agents has been demonstrated on the enzymatic sludge degradation according to the invention. The effect can be seen by higher chemical oxygen demand (COD) values in the solution. Apart from agents presented in detail such as EDTA and Cit A other agents were tested namely: tartaric acid, Zeolite A, fluoride, thiosulphate in combination with Zeolite A, sodium silicate in combination with Zeolite A, and sodium silicate. Citric acid was the best agent tested. Furthermore, citric acid is biodegradable.

The break-up of larger aggregates results in an increase of the specific surface area available for enzymatic hydrolysis. The removal of poly cations from sludge decreases the degree of network but also changes the charges and polarity of the sludge surface. For example, electrostatic binding sites are a crucial indicator for bio-sorption of metals in wastewater treatment and in bioremediation. Sludge charge changes will effect all ionic interactions including the non-cation type. It has been shown that the lower the hydrolysis temperature the less negative groups are released.

The at least one chelating reagent is added to the sludge suspension in a total final concentration of about 0.1-200 mM (of the total sludge suspension), preferably added in a total final concentration of about 0.1-75 mM, e.g. 1-75 mM (of the total sludge suspension). For instance the chelating agent can be added in a concentration of about 5, 10, 15, 20, 25, 30, 35, 40, 45, 50, 55, 60, 65, 70, and 75 mM. Preferably the chelating agent can be added in a concentration of about 0.1-50 mM, preferably 0.1-25 mM and more preferably 0.1-10 mM, e.g. 0.1-5 mM. The chelating agent can be added in a concentration of about 1-50 mM, e.g. 1-25 mM.

In the method according to the invention an enzyme mixture is provided capable of digesting natural polymeric materials. It is realized by a person skilled in the art that any type of enzyme, not specifically mentioned herein, may be used in the enzyme mixture as long as the desired effect is achieved.

In one embodiment of the invention the at least one enzyme in the enzyme mixture is chosen from glycosidic enzymes, lipases, proteases, oxidases, phytases. Thus, the enzyme mixture may comprise one or more enzymes. Other examples of enzymes that can be used are amylases, cellulases, xylanases, dextranases and glycanses. The enzymes can be selected depending on the type and source of the sludge. Preferred enzymes are proteases such as Alcalase (product name of commercially available protease) and lipases such as Lipolase (product name of commercially available lipase). Alcalase is a protease that has a very broad specificity, namely high specificity for aromatic aminoacids such as Phe, Trp, and Tyr, acidic aminoacids Glu, sulfur-containing aminoacids such as Met, and aliphatic amino acids such as Leu and Ala. Above mentioned protease shares specificities which are separately associated with a few proteases. The same is valid for the commercially available Lipolase that has a broad substrate specificity. In other words, it promotes the hydrolysis of a wide variety of triglycerides.

In a further embodiment of the invention the enzyme mixture is a combination of for instance at least two enzymes, e.g. the combination comprises for instance α-amylase and cellulase, laccase and lipolase, laccase and α-amylase, or any other combination of the above. A further combination of enzymes is for instance a protease such as Alcalase and a lipase such as Lipolase. The enzyme(s) in the enzyme mixture should be capable of digesting natural polymeric materials, i.e. have the ability to digest the present natural polymeric materials. This is an important feature of the enzyme(s), since otherwise the sludge would not be digested and/or broken down. In other words, the enzyme(s) is/are added to the water purification process for digesting natural polymeric materials. Thus, the enzymes are added in an effective amount to digest the present natural polymeric materials.

An advantage of the present invention is that the enzymatic dissolving process according to the present invention is much faster compared to a conventional enzymatic dissolving process. For instance, the enzymatic dissolving process takes place for 1-12 hours, preferably 3-8 hours, more preferably 4-6 hours, for example 4 hours. A conventional enzymatic dissolving process would require at least 12 hours.

One of the major sources of the organic matter in sludge are extracellular polymeric substances (EPS), found in two forms: soluble and bound EPS, depending on the sludge source. The soluble EPS can be extracted by centrifugation alone while bound EPS in flocs of biomass requires additional treatments. The major components in the EPS are polysaccharides and glycoconjugates. Therefore, possible key enzymes selected to hydrolyze sludge were endo-glycanases. The pH optima for most of the enzymes are in the acidic region and the molecular mass is about 50 kDa. They are composed of a single polypeptide chain and are stable above ambient temperature up to 50° C. However, depending on the type of key enzymes used the pH may be in the neutral range.

The architecture of sludge flocs is dependent on the interaction between the microbial polymers, acidic polysaccharides, glycoconjugates and lectin-like protein binding polysaccharides as well humates that are linked by polycations present in the sludge.

It is sometimes required to adjust the pH of the sludge suspension in the method according to the invention to about 6-9, preferably 7-8, after addition of the at least one chelating reagent by adding an acid or base, for instance by adding HCl or NaOH or any other suitable base or acid.

In an embodiment of the invention the treatment takes place in any anaerobic digester, i.e. without the presence of oxygen. The end product of an anaerobic process is methane, which can be recovered from the anaerobic process to obtain an additional product to be used in other applications. Thus, not only is an increased digestion of the sludge obtained, but a value-added product is also obtained from the process. Thus, a very important embodiment of the invention is the use of the method of the invention in an anaerobic environment, whereby a value added product such as methane can be separated and reused.

The mass ratio of the enzyme mixture:sludge dry solids is from about 0.1-140 mg/g dry solids, preferably 0.1-70 mg/g dry solids, e.g. 1-70 mg/g dry solids, more preferably 1-55, more preferably 1-35 and more preferably 1-14 mg/g dry solids. The mass ratio of enzyme mixture:sludge dry solids could for example be as low as preferably 0.1-5, 0.1-10 or 2-6 mg/g dry solids for economical reasons.

In the context of the present invention the mass ratio of the enzyme mixture:sludge suspension has been defined to the range of 0.1-140 mg/g dry solids. The enzyme mixture could, in addition to enzymes, comprise other amounts of constituents such as water, or suitable organic or inorganic solvents or other components. The enzyme mixture used in the method of the invention could for instance be a commercially available enzyme products containing the relevant enzyme(s) and amounts of solvent(s) and other components for these enzyme(s). It is naturally important that these other components and solvents do not disturb the important activity of the enzymes. The following commercially available enzyme products from Novozyme A/S: could be comprised in the enzyme mixture used in the method of the invention: Termamyl 300 L, Type DX (amylase) with a declared activity of 300 KNU/g, (37° C. pH. 5.6), Lipolase 100 L (lipase) 100 KLU/g (30° C., pH 7.0), Celluclast 1.5 L (cellulase) 700 EGU/g. (30° C. pH. 5.6), Pulpzyme HC (endo-Xylanase) 1000 AXU/g; and Dextranase Plus L (dextranase), Alcalase 2.4 LFG (protease) 2.4 AU-A/g (37° C. pH. 8.5). In order to further explain the above, a non-limiting example of the invention is the case where a mass ratio of enzyme mixture: sludge dry solids is 13.7 mg/g, which means, in this non-limiting example, 13.7 mg of one or a mixture of several commercial enzyme products per 1 g sludge dry solids.

The enzyme mixture used in the method is not to be limited to the above mentioned specific examples of commercially available enzyme products.

A person skilled in the art realizes the required amount of enzymes needed in the enzyme mixture to get an efficient degradation of sludge in view of the conditions of the process, i.e. temperature, type of sludge, and required efficiency and so on.

In another embodiment of the invention the method further comprises the step of adding at least one species of fermenting bacteria to the suspension, thereby fermenting the resulting sludge suspension obtained in step b) of the method of the invention. Thus, it is also possible to further increase the degradation of the sludge by adding different fermenting microbes, e.g. fermenting bacteria, to the suspension. The fermenting bacteria are for instance chosen from acidogenic bacteria, acetogenic bacteria, and methane producing bacteria. Preferably, the fermenting bacteria are chosen from the group consisting of *Gluconobacter oxydans*, *Acetobacter* sp., *Acetogenium kivui*, *B. macerans*, *B. polymyxa*, *B. coagulans*, *Lactobacillus buchneri*, *Clostridium thermoaceticus*, *Clostridium lentocellum*, *Clostridium formicoaceticu*, *Clostridium thermocellum* and *Pseudomonas* sp. Naturally any other species of bacteria, not specifically mentioned, can be used in this embodiment of the invention. Furthermore, the methane producing bacteria are chosen from the group consisting of *Methanosarcina barkeri*, *Methanosarcina mazeii*, *Methanosarcina soehngenii*, *Methanosarcina acetivorans*, and *Methanosaeta* sp, and mixtures thereof.

It is also possible according to the invention that the methane produced is separated from the sludge suspension. As have been stated above, an additional effect is achieved in accordance with this particular embodiment in the form of a value-added product.

In the context of the present invention the phrase "natural polymeric materials" that are digested by the enzymes are for instance proteins, polysaccharides, polyphenols, lignins, humates, fats, waxes, and mineral oils. Naturally the phrase includes any other material or components, not specifically mentioned here, that are present in the sludge and are also effected by the present enzymes.

In the present context the words "chelating reagent" and "chelator" and "chelating agent" are used interchangeably. However, they all are to be interpreted in the same way as the generally known definition of chelating agent.

The temperature of the sludge suspension in the method of the invention is from about 4° C. to about 90° C., preferably from about 10° C. to about 80° C., and more preferably from about 30° C. to about 60° C., and even more preferably from 37° C. to about 40° C. The temperature is chosen on the basis of the present enzymes and their action on the natural polymeric materials. A skilled man in the art can determine the optimal conditions in order to achieve an efficient degradation.

In order to further optimize the method of the invention the sludge suspension could be subjected to agitation in the range from above 0 to 200 rpm. The agitation is beneficial from an efficiency point of view. The enzymes are able to act more efficiently since the agitation causes the sludge to become more available.

In a further embodiment of the invention the sludge is pre-concentrated, prior to the addition of enzymes, chelating agent and optionally bacteria, by gravitation or enhanced sedimentation to the range 10-80 g sludge solids per 1 l sludge suspension.

In summary, according to the method of the present invention it has been shown, in view of the examples below, that in the presence of a chelating agent such as Cit A or EDTA the following beneficial effects are observed: Sludge solubilization is clearly enhanced and the entrapment of added enzymes into solid is significantly reduced and the activity of the enzymes is enhanced both in solid and liquid fractions. Enzymes are more efficient together with chelating agents than when used alone. This means that the dosage of enzymes can be smaller together with a chelating reagent compared to in the absence of a chelating reagent. Thereby, the process can become more cost effective.

In order to further explain the invention, the following non-limiting experiments are provided to show the beneficial effects of the invention.

Experiments

Materials and Methods

Sludge and Reagents

Surplus biological sludge, used in the experiments herein, was obtained from a local municipal wastewater treatment plant in Lund (Sweden). New collected sludge was settled for 2-4 hours at 4° C. and further thickened by centrifugation at 7000 g at 4° C. for 10 minutes. The sludge was left overnight at 4° C. before use The total solid (TS) content was in the range of 2% and 4%.

All reagents used were of analytical purity. Fatty alcohol ethoxylate (FAE, Synperonic 91/6), and low molecular weight polypropylene glycol (PPG 4, polypropylene glycol P 400 E) were a gift from MB-Sveda, Malmö, Sweden. Citric acid (Cit A) and ethylenediamine-tetraacetic acid disodium salt dihydrate (EDTA) were supplied by Merck.

All used enzymes were of technical grade. Protease (Alcalase 2.4 L), lipase (Lipolase 100 L), and glycanases: dextranase (Dextranase PlusL), endo-xylanase (Pulpzyme HC), cellulase (Celluclast 1.5 L), α-amylase (Termamyl 300 L) were a gift from Novozyme A/S, Denmark.

Analytical Methods

All sludge samples were centrifuged at 7000 g and 4° C. for 10 minutes, solid and liquid phase were further analyzed. Chemical oxygen demand (COD) was determined in the liquid phase using the COD cell test from Merck (No. 1.14541.0001). For each new batch of sludge TS was determined in accordance with standard methods (APHA 1995).

The enzyme activity was measured in both liquid and solid part of sludge using soluble chromogenic substrates accordingly to the assay procedures from Megazyme, Ireland (Megazyme). The following substrates were used (i) for protease, AZO-Casein (2% solution in 0.1M phosphate buffer, pH 7.0), (ii) for cellulase, AZO-CM-Cellulose (2% solution in 0.1M sodium acetate buffer, pH 4.5). One enzyme unit of activity is defined as the amount of the enzyme required to hydrolyze one micromole of soluble substrate per minute under standard assay conditions (i: pH 7.0 or ii: 4.5 and 45° C.).

Enzyme Treatment of Sludge

Enzymatic treatments were performed in 1 L reactors under controlled temperature conditions (45±1° C.) and the pH was constant during the process (pH 7). Chelating agents, for example citric acid (Cit A) or EDTA were added to sludge as powder to a final concentration of 25 mM or 50 mM. Addition of 50 mM EDTA or Cit A caused the pH to decrease to 5.5 and 3.3, respectively. Before enzymes were added the pH of sludge was adjusted to 7 using 1M NaOH. Mixtures of enzymes A and B were added to pre-concentrated sludge (TS 2%) to the different enzyme concentrations: 68.5 mg (60 mg A and 8.5 mg B), 54.8 mg (48 mg A and 6.8 mg B), 34.25 mg (30 mg A and 4.25 mg B) and 13.7 mg (12 mg A and 1.7 mg B) of total enzymes per 1 g TS of sludge and reacted during 4 hours. During the treatment the sludge was continuously mixed with propeller stirrer at 200 rpm.

60 mg of the enzyme mixture A contained: 12 mg of each of the following enzyme preparations from Novozyme A/S: Termamyl 300 L, Type DX (amylase) Declared activity: 300 KNU/g (37° C. pH. 5.6), Lipolase 100 L (lipase) 100 KLU/g (30° C., pH 7.0), Celluclast 1.5 L (cellulase) 700 EGU/g (30° C. pH. 5.6), Pulpzyme HC (endo-Xylanase) 1000 AXU/g; and Dextranase Plus L (dextranase), and the enzymes were suspended in 1.2 mg of PPG 4 and 0.12 mg of FAE. 8.5 mg of enzyme mixture B contained 8.5 mg of enzyme preparation Alcalase 2.4 LFG (protease) 2.4 AU-A/g (37° C. pH. 8.5).

Enzymatic treatments were performed without chelating agents for reference. The results of the addition of Cit A and EDTA with enzymes to the COD values can be seen in FIG. 1. In laboratory scale, at low dosage of enzymes e.g. 13.7 mg/g TS the addition of 25 mM EDTA almost tripled the COD release (COD is an indicator for enzymatic sludge dissolving) compared to the enzyme treatment without chelating agent and the influence of the addition of 25 mM Cit A was even better.

Figure 2:
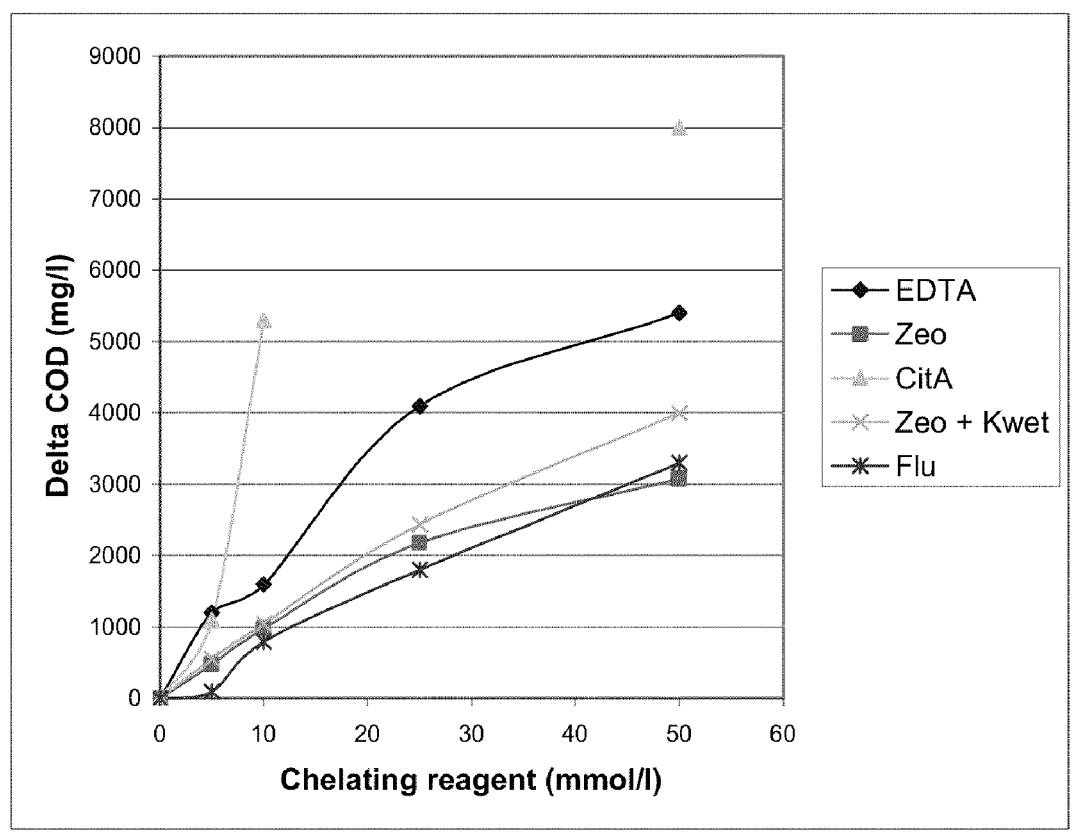
FIG. 2 depicts the ΔCOD (mg/l) released when using enzymes together the chelating reagents citric acid (Cit A), EDTA, zeolite (Zeo), sodium fluoride (Flu), and zeolite in combination with sodium silicate (Zeo+Kwet) (Kwet is the product name of sodium silicate sold by Kemira).

Another experiment was made using the chelating reagents below of different concentrations with 68.5 mg (60 mg A and 8.5 mg B) enzyme mixture per 1 g of sludge TS: EDTA, zeolite A, Cit A, zeolite A+sodium silicate (Zeo+Kwet) and sodium fluoride (Flu). COD release was measured and in FIG. 2. the results are presented as ΔCOD (delta COD) (ΔCOD is the value in which the COD value of the enzymatic treatment without chelates has been subtracted from the COD value of the treatment with enzymes and chelate). The best results are seen for Cit A and EDTA.

Figure 3:
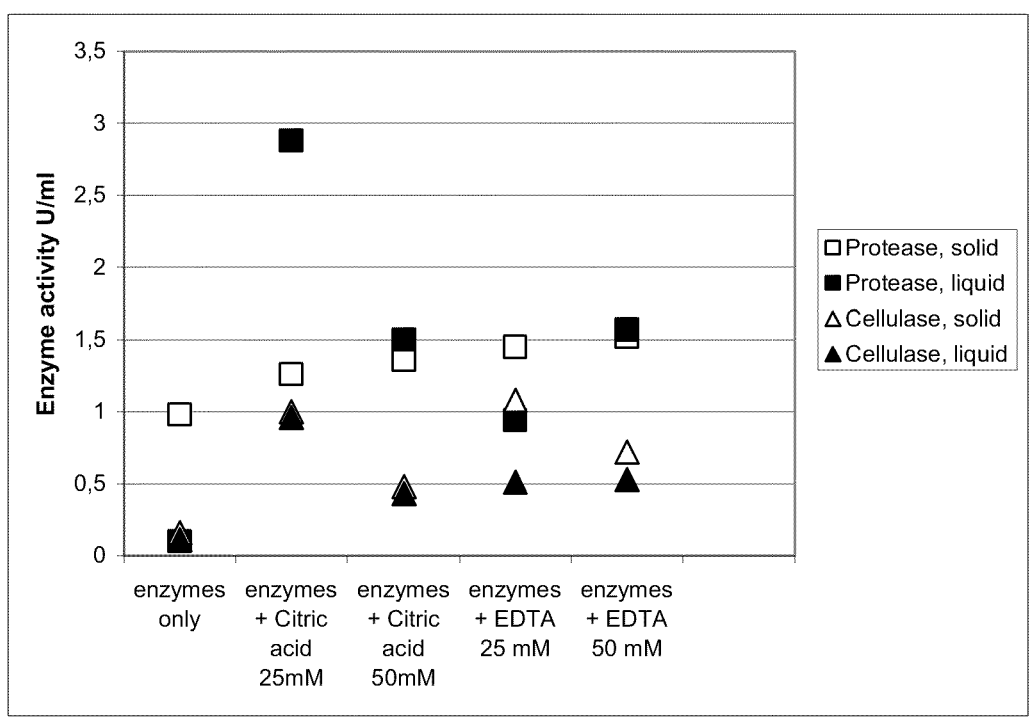
FIG. 3 depicts the activity (enzyme activity U/ml) of the enzymes proteases and cellulases in the solid and liquid phase in the presence of chelating reagents, Cit A and EDTA, at 25 mM and 50 mM as well as in the absence of any chelating reagent. The amount of enzymes in all samples was 137 mg/g dry solids sludge.

In a third experiment the sludge was treated according to the first experiment using higher amount of enzyme mixtures 137 mg/g sludge TS (120 mg A and 17 mg B). The activities of the protease and cellulase were measured from the solid and liquid fraction after 24 h from the treatment according to the method described earlier. The enzymes with chelates have still considerable activity left compared to the treatment with enzymes only. As can be seen in FIG. 3 the enzyme activity is clearly higher for both proteases and cellulases, in both liquid and solid phase, in the presence of the chelating agents Cit A and EDTA compared to the treatment without chelating agents. Especially increased activity is seen by proteases in liquid phase in the presence of 25 mM Cit A.

The invention claimed is:

1. A method for treatment of sludge in water purification comprising:
   a) providing an enzyme mixture comprising at least one enzyme capable of digesting natural polymeric materials;
   b) adding the enzyme mixture and at least one chelating reagent, in either order or simultaneously, to an aqueous sludge suspension,
   wherein the at least one chelating reagent is chosen from the group consisting of citric acid and its salts, and
   the at least one chelating reagent is present in a concentration of about 0.1-200 mM.

2. A method according to claim 1, wherein the at least one chelating reagent is present in a concentration of about 1-75 mM.

3. A method according to claim 1, wherein the at least one enzyme in the enzyme mixture is chosen from the group consisting of glycosidic enzymes, lipases, proteases, oxidases, and phytases.

4. A method according to claim 1, wherein the pH is adjusted to 6-9 after addition of the at least one chelating reagent by adding an acid or base.

5. A method according to claim 1, wherein the treatment takes place in any anaerobic digester.

6. A method according to claim 1, wherein the mass ratio of the enzyme mixture: sludge dry solids is about 0.1-140 mg/g dry solids.

7. A method according to claim 6, wherein the mass ratio is about 1-70 mg/g dry solids.

8. A method according to claim 1, further comprising the step of adding at least one species of fermenting bacteria to the suspension, thereby fermenting the resulting sludge suspension obtained in step b).

9. A method according to claim 8, wherein the fermenting bacteria are chosen from the group consisting of acidogenic bacteria, acetogenic bacteria, and methane producing bacteria.

10. A method according to claim 9, wherein the fermenting bacteria are chosen from the group consisting of *Gluconobacter oxydans, Acetobacter* sp., *Acetogenium kivui, B. macerans, B. polymyxa, B. coagulans, Lactobacillus buchneri, Clostridium thermoaceticus, Clostridium lentocellum, Clostridium formicoaceticu, Clostridium thermocellum*, and *Pseudomonas* sp.

11. A method according to claim 9, wherein the methane producing bacteria are chosen from the group consisting of *Methanosarcina barkeri, Methanosarcina mazeii, Methanosarcina soehngenii, Methanosarcina acetivorans, Methanosaeta* sp, and mixtures thereof.

12. A method according to claim 11, wherein the methane produced is separated from the sludge suspension.

13. A method according to claim 1, wherein the natural polymeric materials are selected from the group consisting of proteins, polysaccharides, polyphenols, lignins, humates, fats, waxes, and mineral oils.

14. A method according to claim 1, wherein the temperature of the sludge suspension is from 4° C. to 90° C.

15. A method according to claim 1, wherein the sludge suspension is subjected to agitation in the range from above 0 to 200 rpm.

16. A method according to claim 1, wherein the sludge is pre-concentrated, prior to the addition of enzymes, chelating reagent and optionally bacteria, by gravitation or enhanced sedimentation to the range 10-80 g sludge solids per 1 l sludge suspension.

* * * * *

UNITED STATES PATENT AND TRADEMARK OFFICE
CERTIFICATE OF CORRECTION

PATENT NO. : 8,377,304 B2  Page 1 of 1
APPLICATION NO. : 12/601593
DATED : February 19, 2013
INVENTOR(S) : Dey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 570 days.

Signed and Sealed this
First Day of September, 2015

Michelle K. Lee
*Director of the United States Patent and Trademark Office*